May 6, 1969     T. P. RADEMACHER     3,442,528
STEERING AXLE MOUNT FOR A WHEELED TOY
Filed April 18, 1967     Sheet 1 of 2
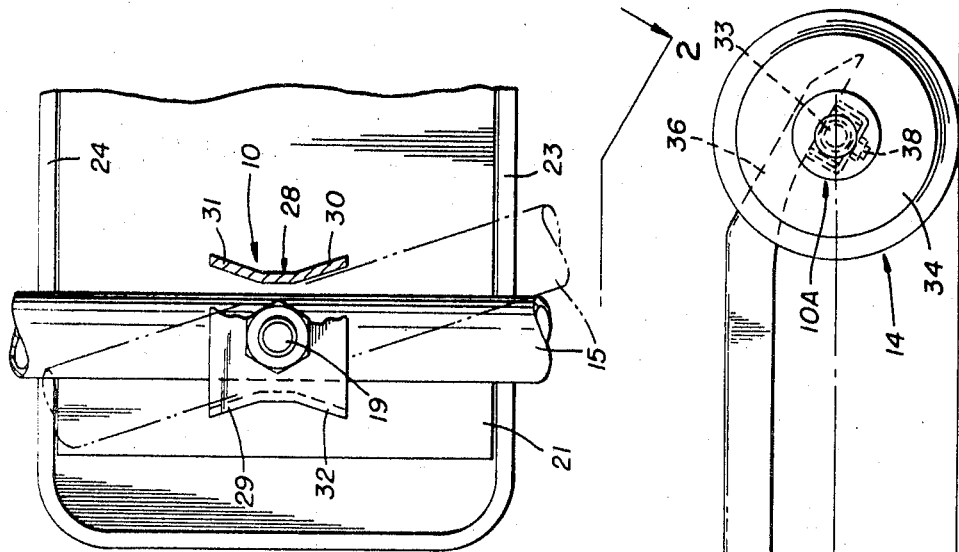
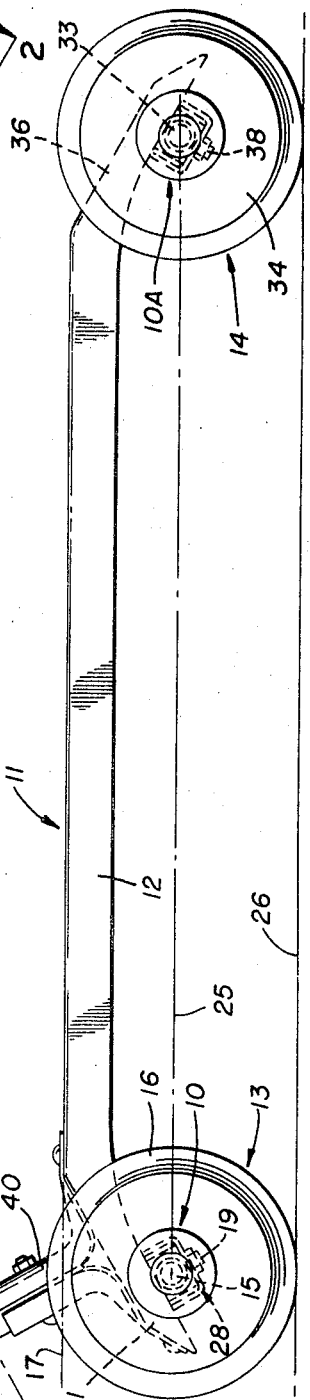
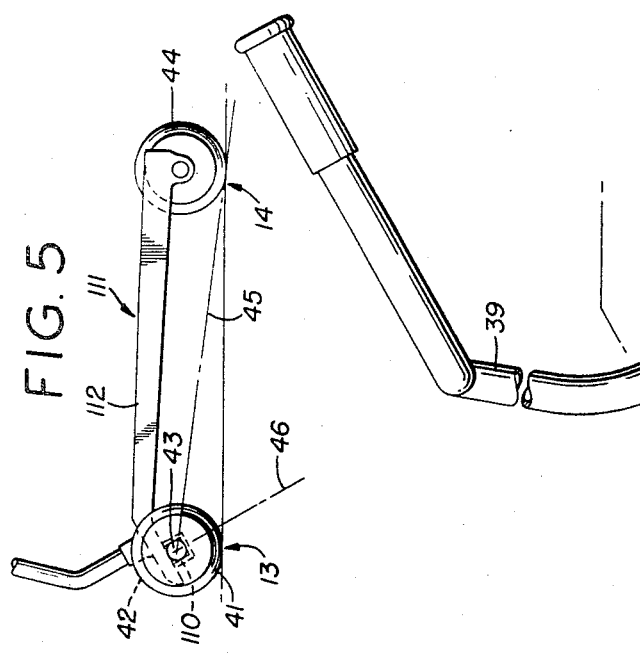
INVENTOR.
THOMAS P. RADEMACHER
BY Hamilton & Cook
ATTORNEYS

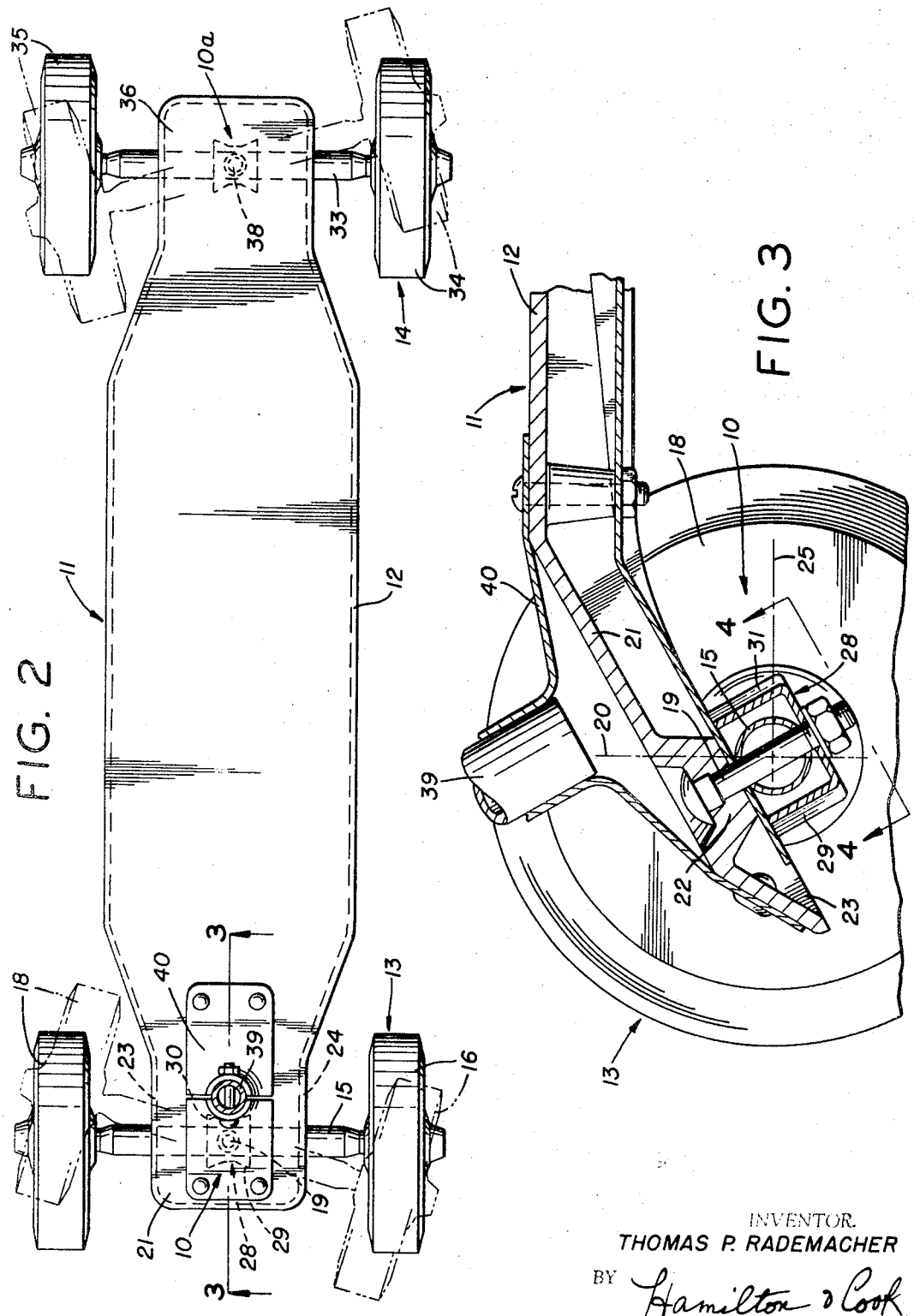

United States Patent Office 3,442,528
Patented May 6, 1969

3,442,528
STEERING AXLE MOUNT FOR A WHEELED TOY
Thomas P. Rademacher, Medina, Ohio, assignor to Sun Corporation, Barberton, Ohio, a corporation of Ohio
Filed Apr. 18, 1967, Ser. No. 631,674
Int. Cl. B62b *1/00, 5/00*
U.S. Cl. 280—87.04     3 Claims

ABSTRACT OF THE DISCLOSURE

A steering and tracking mount adaptable for the front and rear axles of a toy riding vehicle whereby the front and rear axles, each of which may have two laterally spaced wheels rotatably mounted thereon, properly turn in response to the rider leaning into the direction he desires to have the vehicle turn. When two such axles are employed both are pivotally mounted to a rigid frame member extending therebetween. The swing pins by which the axles are mounted to respective support means affixed to the frame are oriented perpendicularly with respect to the axle mounted thereby and convergently downward with respect to each other, each swing pin being inclined at an angle of between 25 to 35 degrees with respect to a vertical reference. In the preferred embodiment disclosed the support means are disposed so as to extend longitudinally outwardly and downwardly from the frame, also at an angle of inclination between 25–35 degrees with respect to a horizontal reference.

Background of the invention

Steering arrangements for toys have heretofore been one or the other of two varieties. In one variety the supporting wheel, or wheels, and the axle means on which they are mounted, are directly steerable in response to rotation of a steering wheel, handle bar or the like. In the other variety the wheels are rigidly mounted on the toy, and the toy is caused to tip, upon application of the rider's weight, so that wheels provide only edge contact and thus cause the vehicle to tend to turn along an arc in a direction of the edge contact.

The directly steerable construction is the most widely accepted and does work quite well. However, it requires an operative connection in the nature of a motion transmitting arrangement between the steered supporting wheel, wheels, or axle means on which the wheels are mounted, and the steering wheel. In constructions where only a single wheel, or its axle means, is steerable a direct connection, such as used on bicycles, is most economical. However, in constructions where a pair of wheels mounted on a single axle are required to be steered, complex mechanical connections have heretofore been required to effect steering.

Those constructions where the axle means is rigidly connected to the frame, and edge contact is employed to steer may be the least expensive, but they constitute an ever present danger. With edge contact the frictional engagement between the wheel edge and the surface contacted thereby may not be consistently sufficient to withstand lateral thrust. On the other hand the rider may lean too far and lose his balance. In either event a nasty fall is quite likely.

It is therefore a primary object of the present invention to provide a steering mount which is particularly suited for use in steering axles on which two, laterally spaced, wheels are rotatably mounted.

It is another object of the present invention to provide a steering mount, as above, in which the axle is steerable without the use of a motion transmitting connection between the axle and a steering wheel, or the like.

It is a further object of the present invention to provide a steering mount, as above, in which steering control is effected by the rider leaning into the direction of the desired turn and yet without causing either wheel on the steered axle to lose ground contact.

It is a still further object of the present invention to provide a construction, as above, in which two axles may each be provided with two, laterally spaced wheels and both axles are so steerable in order to provide tracking of all four wheels on a turn.

It is an even further object of the present invention to provide a steering and tracking mount, as above, which, while reliable, is exceedingly inexpensive to manufacture and maintain.

These and other objects which will become apparent from the following specification are accomplished by means hereinafter described and claimed.

In general, a steering mount constructed in accordance with the concept of the present invention is used to secure an axle on which are rotatably journaled two, laterally spaced wheels to the frame of riding toy vehicle. A swing pin pivotally mounts the axle to a support means on the frame, the swing pin being inclined with respect to the vertical such that the axle will turn in response to a tilting of the frame. For best results it has been found that the swing pin should be inclined between 25 to 35 degrees with respect to a vertical reference.

With both the front and rear axles so mounted the rear axle will also properly turn in response to the rider leaning into the turn so that the wheels will track around the turn. In order that the two axles turn properly, it is imperative that the inclination of the two swing pins converges downwardly. This can be assured in several ways, one of which is to incline the support means longitudinally downwardly at an angle below a horizontal reference such that the swing pins are inclined, as desired. By the use of inclined support means cam means may also be provided thereon to assist in turning the axle. Also a swing stop may be easily provided to limit the range in which the axle is permitted to pivot about its swing pin.

One preferred embodiment, and one alternative arrangement, are shown by way of example in the accompanying drawings and are described in detail without attempting to show all of the various forms and modifications in which the invention might be embodied; the invention being measured by the appended claims and not the details of the specification.

Description of the drawings

FIG. 1 is a side elevation of a riding toy vehicle, particularly a four-wheel scooter, in which a steering and tracking mount incorporating the concept of the present invention is embodied;

FIG. 2 is a top plan, with the handle in section, taken substantially on line 2—2 of FIG. 1 depicting the axles oriented for straight travel, in full line representation and for a right turn in the chain line representation;

FIG. 3 is an enlarged cross section taken substantially on line 3—3 of FIG. 2;

FIG. 4 is a partial bottom plan, partly broken away, taken substantially on line 4—4 of FIG. 3; and, FIG. 5 is a view similar to FIG. 1, but in smaller scale, in which a steering mount according to the concept of the present invention is applied to a three-wheeled vehicle.

Description of a preferred embodiment

Referring more particularly to the drawings, the steering and tracking mount, indicated generally by the numeral 10, is depicted in conjunction with a toy riding vehicle 11 in the nature of a scooter. The vehicle 11 has a frame 12 which extends between the supporting wheel means 13 and 14, being the front and rear, respectively.

As will become apparent either the front or the rear wheel means 13 and 14, or both, may be secured to the frame 12 by a mount 10. In the embodiment depicted in FIGS. 1–4 both wheel means are so secured—the front wheel means 13 by mount 10 and the rear wheel means 14 by mount 10A.

The mount 10 is adapted to suspend a rigid axle 15 on which are rotatably journaled two, laterally spaced wheels 16 and 18. As shown in FIG. 3, the front axle 15 is pivotally mounted, or journaled, on a swing pin 19. The swing pin 19 while being oriented perpendicularly to the axle 15, is inclined at between 25 to 35 degrees with respect to a vertical reference 20.

To facilitate this orientation, a support arm 21 extends longitudinally outwardly of the frame 12 and is inclined downwardly from a horizontal reference 17, also at an angle of between 25 to 35 degrees. As such, the swing pin 19 may be anchored in a boss 22 in support arm 21 and extend generally perpendicularly therefrom to permit the axle 15 to pivot or swing, in a plane parallel to the plane of the support arm, as defined by cam surfaces 23 and 24 presented by the lipped edges of the support arm 21.

At this point a general understanding of the steering aspect can be imparted. With the axle 15 oriented in the full line representation (FIGS. 2 and 4) the vehicle 11 will proceed straight ahead. Should the rider desire to turn the vehicle to the right, he need merely lean, or shift his weight, to the right. With his center of gravity thus shifted on the frame 12 the frame will tend to rotate in that direction, about the longitudinal rotational axis of the frame 12. With the axle 15 being pivotally mounted to the frame the rotational axis of the frame 12 will pass longitudinally through the pivotal center of the axle 15 about pin 19, as represented by line 25. This tendency of the frame to rotate also imparts a tendency of the swing pin 19, anchored in the support arm 21 to cant about axis 25.

The opposing reaction to the unrestricted canting of pin 19 is provided by the axle 15, to which the pin 19 remains perpendicularly oriented. The axle, however, is free to pivot about swing pin 19 so that even though the pin 19 and axle 15 remain relatively perpendicular, the axle 15 will turn in a horizontal plane—i.e., that plane defined by the surface 26 on which the wheels 16 and 18 are received.

With the swing pin 19 extending generally medially of the cam surfaces 23 and 24 and the axle 15 juxtaposed thereagainst that cam surface on the side toward which the frame 12 is leaned will engage the axle 15 and tend to turn it in the same direction it will turn to accommodate canting of the swing pin 19. As shown in FIG. 2, when it is desired to turn the vehicle to the right the rider simply leans in that direction and the axle 15 swings toward the chain line representation an amount proportionate to the degree to which the rider leaned. This is accomplished by the axle swinging to accommodate the canting of the pin 19, as assisted by cam surface 23 engaging the axle 15.

It has been found that when the swing pin 19 has been inclined at less than 25 degrees the axle will not always swing to accommodate the tendency of the pin 19 to cant so that either the vehicle will not turn or the wheel opposite the desired direction of the turn will lift off the ground. Conversely, it has been found that when the swing pin 19 has been inclined at more than 35 degrees, the frame tends to rotate too far in relation to the degree to which the axle is swung.

In any event it is desirable to limit the degree of relative rotation between the axle 15 and the frame 12. As best seen in FIGS. 3 and 4, a swing stop 28 is secured to the support arm 21 for this purpose. The swing stop 28 depicted is in the form of a channel received over the axle in proximity to the swing pin 19 with the legs flared outwardly to define the swing limits of the axle. For example, the flared legs 29 and 30, against which the chain-line representation of the axle 15 abuts in FIG. 4, limits the swing of the axle as the vehicle is turned to the right. Similarly, the flared legs 31 and 32 will limit the axle swing as the vehicle is turned to the left.

In the embodiment depicted the rear axle 33, with the two, laterally spaced wheels 34 and 35 journaled thereon, is also attached to the vehicle by the unique steering mount 10A. Here too, a support arm 36 extends longitudinally outwardly of the frame 12 and, for convenience, is inclined below a horizontal reference to facilitate orientation of the rear swing pin 38 at an inclined angle with respect to a vertical reference. Again the preferred inclination is between 25 to 35 degrees.

In order that the front and rear wheels will track on a turn, as depicted by the chain line representations in FIG. 2, it is mandatory that the swing pins 19 and 38 are inclined convergently downwardly; otherwise the wheels will not turn in the direction the rider leans. That is, the extended axes of the pins will converge generally toward each other beneath the vehicle 11.

It should now be apparent that no motion transmitting connection is required between the handle bar 39 and the axles or wheels journaled thereon. The handle bar 39 can be dispensed with entirely but is added to provide a convenient assist to the balance of the rider. In such a case the handle bar 39 is received in a stanchion 40 secured rigidly to the vehicle. To allow as much standing room on the frame as possible the stanchion 38 is depicted as being secured to the front support arm 21.

When both a front and rear wheel means 13 and 14 comprise two laterally spaced wheels journaled on axles, as described above, the rotational axis 25 of the frame 12 will extend between the pivotal center of axle 15 about pin 19 and the pivotal center of axle 33 about pin 38. However, steering may be accomplished in accordance with the concept of the present invention when only one of the wheel means comprises two, laterally spaced wheels journaled on an axle and the other wheel means is merely a single wheel. In that event the rotational axis of the frame would extend between the pivotal center of the single axle so used about its swing pin and the point of ground contact of the single wheel. Although either the front or rear wheel means may be the single wheel, FIG. 5 depicts the front wheel means 13 having two wheels 41 and 42 mounted on a pivotal axle 43 and the rear wheel means 14 being a single wheel 44. The rotational axis of the frame 112 is thus represented by line 45, and this vehicle 111 will steer as follows.

The rider of vehicle 111 also simply leans in the direction he desires to turn and the tendency of the frame 112 to rotate about axis 45 in response to the shifting of the rider's center of gravity causes the axle 43 to interact about its swing pin, not shown, exactly as previously described in conjunction with axle 15.

In order to provide the required interaction, a downward extension, represented by line 46, of the axis of said swing pin must extend generally in the direction of the other wheel means 14 beneath the frame 112. Accordingly, when the front wheel means 13 is provided with the steering mount 110 the line 43 will extend rearwardly beneath frame 112; and, when the rear wheel means is provided with a steering mount, not shown, a line corresponding to line 45 but forming a downward extension of the swing pin about which the rear axle is pivoted would extend forwardly beneath the frame 112.

The rear wheel means 14, being only a single wheel 44 in the modification shown in FIG. 5 offers no resistance to the interaction of the axle 43 and its mount 110 so that steering is accomplished according to the concept of the present invention.

It should, therefore, now be apparent that an axle mount as herein described may be used for steering responsive to the weight shifting of the rider on either the front, rear, or both, axles. Additionally, when used on both axles the unique mounting arrangement provides tracking of all four wheels.

I claim:

1. In a toy vehicle having a frame supported on wheel means at least one of which has a pair of laterally spaced wheels rotatably journaled on an axle extending transversely of said frame, a steering mount, said steering mount comprising, a support arm affixed to said frame, a pair of spaced cam means on said support arm, said cam means extending longitudinally outwardly of said frame and in a plane inclined downwardly with respect to a horizontal reference, a swing pin mounted on said support arm medially of said cam means, the axle pivotally mounted on said swing pin in juxtaposition with said cam means and swingable in a plane parallel to the plane thereof.

2. In a toy vehicle, as set forth in claim 1, in which the plane of said cam means is inclined downwardly between 25 to 35 degrees with respect to said horizontal reference.

3. In a toy vehicle, as set forth in claim 2, in which both said wheel means comprise a pair of laterally spaced wheels journaled on axles each of which is pivotally supported on a swing pin, said swing pins being inclined convergently downwardly, each at an angle of between 25 to 35 degrees with respect to a vertical reference.

References Cited

UNITED STATES PATENTS

| | | |
|---|---|---|
| 1,070,468 | 8/1913 | Henley. |
| 2,062,800 | 12/1936 | Shreffler _____ 280—87.04 |
| 2,330,147 | 9/1943 | Rodriguez _____ 280—87.04 |
| 2,413,530 | 12/1946 | Taylor _____ 280—87.04 |
| 2,474,946 | 7/1949 | Kinslow _____ 280—87.04 |
| 3,023,022 | 2/1962 | Boyden _____ 280—87.04 |

FOREIGN PATENTS 1,029,590   5/1966   Great Britain.

LEO FRIAGLIA, *Primary Examiner.*

U.S. Cl. X.R.

280—87.01